E. A. LAUGHLIN.
SIDE BEARING.
APPLICATION FILED MAR. 24, 1913.

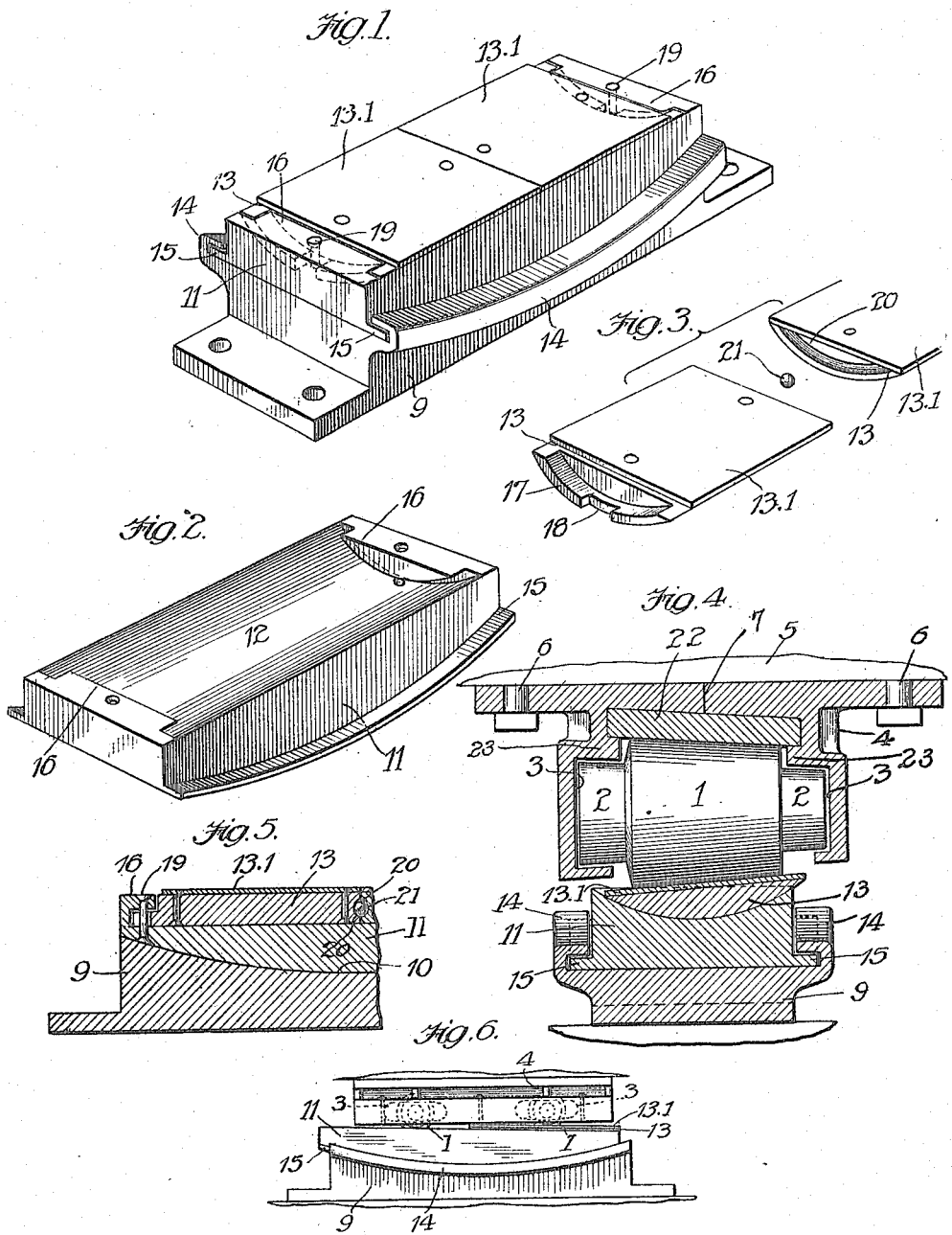

1,133,294.

Patented Mar. 30, 1915.
2 SHEETS—SHEET 2.

Witnesses
Martin H. Olsen.
Leo J. Dumais.

Inventor
Elmer A. Laughlin,
By Rummler & Rummler
Attys.

UNITED STATES PATENT OFFICE.

ELMYR A. LAUGHLIN, OF CHICAGO, ILLINOIS.

SIDE BEARING.

1,133,294.  Specification of Letters Patent.  Patented Mar. 30, 1915.

Application filed March 24, 1913. Serial No. 756,491.

*To all whom it may concern:*

Be it known that I, ELMYR A. LAUGHLIN, a citizen of the United States of America, and a resident of Chicago, county of Cook, and State of Illinois, have invented certain new and useful Improvements in Side Bearings, of which the following is a specification.

This invention relates to roller bearing constructions and has particular reference to side bearings for railway cars.

The main objects of the invention are to provide a side bearing the elements of which are reversible as to their connection with the upper or car body bolster or the lower or truck bolster; to provide a side bearing wherein the rollers are urged by gravity to substantially central positions in their ways, but are free to move within a limited space adjacent to said central positions to distribute the wear on the roller over its entire circumference and over a comparatively large area of the wearing plates or tracks upon which the rollers operate and thereby avoid flattening of the rollers or embedding them on the wearing surfaces due to the rolling and pounding action of cars when traveling along straight tracks, such wearing of the rollers resulting in binding or resistance to free movement of the trucks with respect to the car body when rounding curves; to provide an improved method of securing wear plates within the roller housings of side bearings; to provide bearing or wearing plates for rollers, which are automatically adjustable under pressure of the rollers, to equalize the load between a plurality of such rollers; to provide wearing plates automatically adjustable for engaging the surfaces of conical or cylindrical rollers to distribute the load equally throughout the length of the rollers; to provide wearing plates which are automatically tiltable by the pressure of the load to properly engage rollers at different axial inclinations; to provide a plurality of relatively and independently tiltable wearing plates adapted to conform to different axial settings of a plurality of rollers; to provide wearing plates automatically adjustable to rollers which may have a varying path of movement with respect to either the car body or the supporting truck; and to provide bearings of this general type with rollers having conical trunnions whereby the trunnions may run true in their ways.

An illustrative embodiment of this invention is shown in the accompanying drawings, in which—

Figure 7:
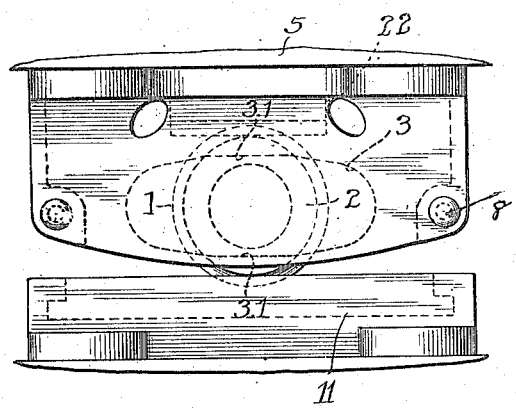
Figure 8:
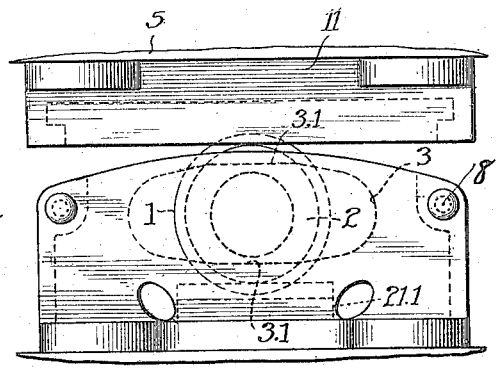
Figure 10:
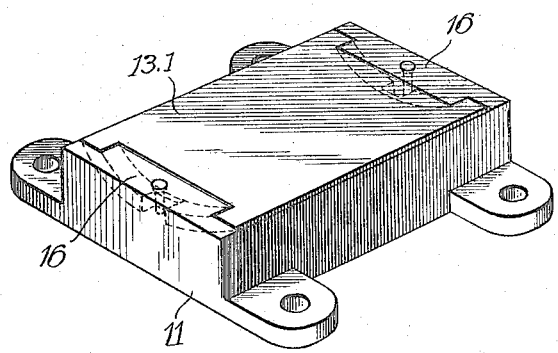
Figure 9:
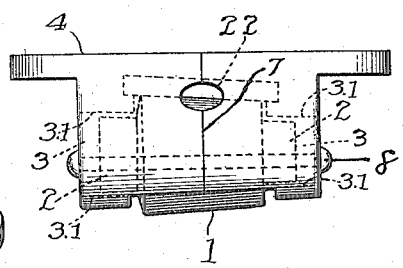

Figure 1 is a perspective view of the truck member of a bearing constructed according to this invention. Fig. 2 is a perspective detail of a bearing plate shown in Fig. 1. Fig. 3 is a perspective detail of the wear plates supported by the bearing plate. Fig. 4 is a sectional view of the complete side bearing showing one of the rollers and its supports secured to a car transom and truck bearing. Fig. 5 is a fragmentary detail in section of the truck bearing member. Fig. 6 is a side elevation of the complete side bearing and shows the truck bearing shifted out of its normal position. Fig. 7 is a detail showing the shape of the runways for the roller trunnions and incidentally a modification of the invention wherein but one roller is employed in each side bearing. Fig. 8 is a detail similar to Fig. 7 but shows the roller housing in reversed position as it would appear when attached to the truck bolster. Fig. 9 is an end view of the roller housing. Fig. 10 is a perspective view of a modification of the truck bearing.

This invention provides a bearing which is adaptable to a wide variety of bearing rollers of different shapes, and also to different sizes of cars and car transoms or bolsters setting at different angles. The invention also includes wearing plates shiftable in their seats, whereby under the action of the weight applied through the roller bearings they are adjustable to different angles during relative rotation of the car and truck. Such adjustable wearing plates also adapt themselves to conical bearing rollers to uniformly engage the latter as well as a properly designed conical plate could engage said rollers. These wearing plates are individually serviceable for coöperating with a single side bearing roller at each side of the ends of the cars, but by combining a pair of these wearing plates with a support which is also tiltable to different angular positions, and a pair of side bearing rollers, the bearing plates become automatically adjustable with respect to each other so that each may rise or descend to different horizontal planes according to the angle at its particular location between the car body and truck, while each still carries its full share of the load.

While in many cases a single bearing roller is sufficient in each side bearing, the drawings show a pair of side bearing rollers 1 and suitable associated bearing members. The pair of rollers are shown because with the tiltable bearing plates it is possible to distribute the load passing through side bearings to a plurality of rollers and thereby gain the attendant advantages of such arrangement.

The rollers 1 have conical trunnions 2 extending into runways 3 in castings forming a housing 4 secured to the under side of a car body bolster 5 by bolts 6. The roller housings or castings 4 are made in two parts separated on the line 7 (Figs. 4 and 8) and connected together by rivets 8, Fig. 9. This method of constructing the castings 4 enables them to be cast without employing cores, and also affords a means for conveniently assembling the rollers and wear plates 22 with the housing so as to be retained therein. The usual method of construction heretofore employed in this respect is to secure the wear plate in the roller housing with two or more rivets and to provide against loss of rollers with a detachable piece secured by two or more rivets. As a rule a single casting forms the roller housing.

Secured to each side of the car trucks are castings 9 provided with concave seats 10, within which rest bearing plates 11 convex on their lower sides to fit the seat 10 and to be movable therein in one direction parallel with the sides of the truck. Each bearing plate 11 has a concave upper surface or seat 12, and movably fitted within seat 12 are a pair of wear plates 13 with their lower faces suitably convex in form for engaging surface 12. The wearing plates 13 are preferably of composite construction, the upper portion 13.1 being a plate of steel or other good wearing material. The wearing plates 13 are movable in their seat 12 transversely of the car trucks and castings 9, while the wearing plates 11 are movable lengthwise of the castings 9 and trucks.

For convenience in assembling and also to prevent lateral movement of the bearing plates 11, the castings 9 are provided with heavy grooved flanges 14 extending upwardly at the sides of the members 11. The members 11 are provided with projections or flanges 15 fitting within the grooves of flanges 14, to be movable therein so that the members 11 may be shifted longitudinally of the truck or the casting 9. The members 11 have semi-circular projections 16 extending inwardly from their ends over semi-circular flanges 17 on the ends of wearing plates 13, for the purpose of retaining the wearing plates in assembled relation with the members 11 while permitting the desired independent movement between the same. Each flange 17 is cut away at 18 and through this cut away part passes a bolt 19 secured to the projection 16. This bolt serves to limit the movement of the wearing plates 13 in their seats in the members 11, and thereby prevents the wearing plates 13 from becoming entirely disengaged from the members 11. Also for the purpose of preventing accidental disengagement between the members 11 and the wearing plates 13 the inner end of each of the wearing plates is provided with a semi-circular groove 20 and a single ball 21 is dropped into these grooves when the bearings are assembled and thereafter serve to assist in retaining the wearing plates assembled with the members 11.

The runways 3 correspond in one respect to the form of runways shown in an application for patent on side bearings of Elmyr A. Laughlin, filed February 17, 1913. Serial No. 748,956.

The present invention differs from the invention described in the aforesaid application in that in the present case the runways are designed to coöperate with conical trunnions, whereas cylindrical trunnions were shown in the former case. The object of the conical trunnions is to cause the rollers to run true in the arc shaped runways 3 when the rollers are returning to their central position when free from the load. The runways or tracks 3 in the present case are further improved in that the central parts of the tracks are so formed that the roller trunnions are not urged into any one position but may freely roll along the central parts of the tracks to distribute the wear of the roller over its circumference and over a comparatively large area of the wear plates and the tracks. The flat parts of the tracks are indicated by the numeral 3.1, Figs. 7 and 8.

The housing 4 supports wear plates 22 with which and the wear plates 13 the rollers 1 normally coöperate. The wear plates 22 are held in place in the housing 4 by flanges 23 which form slots within which the wear plates are seated.

It is customary in car construction to support the cars on their trucks mainly by bearings centrally located on the trucks, the side bearings being serviceable to assist in supporting the car when the car and trucks tilt with respect to each other on rounding curves. In making turns the rollers 1 therefore travel in circular paths around the center bearing, and if at such time the rollers assist in carrying the load of the car they will bear on their respective wear plates 13 forcing the latter to shift within their seats transversely of the trucks and thereby adjust themselves to the rollers in the movement of the latter in a manner that they become equivalent to a conical wearing plate maintained rigid in proper position to permit the rollers to run evenly thereon. The curvature of the lower sides of the wear plates 13 is such that to tilt them out of the horizontal position requires the application of a certain predetermined load to one side of their axial lines, but when the plates are in perfect contact with the rollers their adjustment is varied and maintained as required by the load. It may also be seen that the wearing plates 13 in operation would adjust themselves to conical rollers of different sizes or forms, or to cylindrical or conical rollers which are not exactly horizontally disposed even when in normal position. With these wearing plates, it is also possible to mount the side bearings at different distances from the center bearings without necessitating any change in the design of the side bearing itself.

When a pair of rollers and wearing plates 13 are provided in each side bearing, the movable bearing plate 11 becomes necessary. Otherwise if there is only one roller and one wearing plate 13 to each side bearing, the bearing plate 11 would be integral with the casting 9 and be rigidly secured to the car trucks, as shown in Figs. 7, 8, and 10. When pairs of rollers are employed the shiftable bearing plate 11 serves as a load equalizer for the reason that if greater pressure is applied through one of the rollers said roller will through its wear plate 13 tilt the member 11 until the pressure is equally distributed through both rollers. When the member 11 tilts out of its normal position the wear plates 13 may still tilt relatively to each other if necessary, or together transversely of the member 11. The present invention therefore provides a bearing having a wide range of automatic adjustment to compensate for irregularities in design, mounting or movement of bearing rollers, and also serves as a load equalizer for properly distributing the load between a plurality of rollers.

Although but one specific embodiment of this invention has been herein shown and described, it will be understood that numerous details of the construction shown may be altered or omitted without departing from the spirit of this invention as defined by the following claims.

I claim:

1. In a side bearing for cars, the combination of rollers, and a pair of wearing plates located in substantially the same horizontal plane and supporting said rollers, said plates being tiltable independently of each other transversely to the direction of travel of said rollers.

2. In a side bearing for cars, the combination of rollers, and a pair of wearing plates supporting said rollers, said plates being tiltable independently of each other in one direction and together in a transverse direction.

3. In a side bearing for cars, the combination of a roller, a supporting member, a bearing member movable thereon and having a concave seat formed therein, and a wearing plate for said roller, said wearing plate being convex on one side so as to fit into said concave seat and being movable therein to conform to the path of the movement or form of the roller.

4. In a bearing, the combination of two relatively movable supporting members, a roller located between said members, a bearing member shiftably mounted on one of said supporting members, a wearing plate mounted on said bearing member and movable transversely to the shifting thereof so as to adjust itself to the roller during the movement of the latter.

5. In a bearing, the combination of two rollers suitably arranged to support a weight, a wearing plate below each of said rollers and mounted to be tiltable transversely to the direction of travel of the rollers, a bearing plate supporting both of said wearing plates and mounted to be tiltable in the direction of travel of the rollers, and a support for said bearing plate.

6. In a side bearing for cars, the combination of a roller, a housing for said roller, a wear plate convex on one side and having a flat wearing surface for supporting said roller, and a member having a concave seat within which said wear plate rests, said member and wear plate having interlocking ends arranged so as to allow shifting of said wear plate in said concave seat.

7. In a side bearing for cars, the combination of a roller, a housing for said roller, a wear plate convex on one side and having a flat wearing surface for supporting said roller, and a member having a concave seat on which said wear plate is shiftably supported, said plate and member having oppositely disposed flanges on the ends thereof adapted to overlap each other for shiftably connecting said plate and member together.

8. In a side bearing for cars, the combination of a roller, a housing for said roller, a wear plate convex on one side and having a flat wearing surface for supporting said roller, a member having a concave seat on which said wear plate is shiftably supported, said plate and member having oppositely disposed flanges on the ends thereof adapted to overlap each other for shiftably connecting said plate and member together, one of said flanges having a recess formed therein and a shoulder on the other said flange extending into said recess, said recess and shoulder coacting to limit the relative shifting of said plate and member.

Signed at Chicago this 20th day of March, 1913.

ELMYR A. LAUGHLIN.

Witnesses:
EUGENE A. RUMMLER,
M. IRENE HUTCHINGS.